United States Patent
Luo

(10) Patent No.: US 11,891,085 B2
(45) Date of Patent: Feb. 6, 2024

(54) METHOD AND APPARATUS OF CONTROLLING DRIVERLESS VEHICLE AND ELECTRONIC DEVICE

(71) Applicant: Apollo Intelligent Connectivity (Beijing) Technology Co., Ltd., Beijing (CN)

(72) Inventor: Xiang Luo, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 112 days.

(21) Appl. No.: 17/453,743

(22) Filed: Nov. 5, 2021

(65) Prior Publication Data

US 2022/0126859 A1   Apr. 28, 2022

(30) Foreign Application Priority Data

Dec. 15, 2020   (CN) .......................... 202011481005.2

(51) Int. Cl.
*G06V 10/74*   (2022.01)
*G06V 10/40*   (2022.01)
(Continued)

(52) U.S. Cl.
CPC ............. *B60W 60/001* (2020.02); *B60R 1/12* (2013.01); *G06V 10/40* (2022.01); *G06V 10/74* (2022.01);
(Continued)

(58) Field of Classification Search
CPC ......... B60W 60/001; B60W 2540/215; B60W 60/00253; B60W 2552/00;
(Continued)

(56) References Cited

U.S. PATENT DOCUMENTS 9,919,704 B1 * 3/2018 Kundu ................. H04N 13/243
2014/0085477 A1 * 3/2014 Takano ................. B60R 25/305
348/148

(Continued)

FOREIGN PATENT DOCUMENTS

CN   102632837 A   8/2012
CN   103813941 A   5/2014
(Continued)

OTHER PUBLICATIONS

Suhr, Automatic Parking Space Detection and Tracking for Underground and Indoor Environments, Sep. 9, 2016, IEEE Transactions on Industrial Electronics, vol. 63, No. 9 (Year: 2016).*

(Continued)

*Primary Examiner* — Elaine Gort
*Assistant Examiner* — Matthias S Weisfeld
(74) *Attorney, Agent, or Firm* — Hunton Andrews Kurth LLP

(57) ABSTRACT

A method and an apparatus of controlling a driverless vehicle and an electronic device are provided, and relates to the field of artificial intelligence technologies, such as computer vision and self-driving. The method includes: in a case that a stop instruction is received or a driverless vehicle arrives at a preset position, acquiring a first road surface image captured by a camera of the driverless vehicle that is on a same side of a door of the driverless vehicle; acquiring, based on the first road surface image, a target road surface state of road surface on one or two sides of the driverless vehicle that are provided with a door; in a case that the target road surface state is a first road surface state, controlling the driverless vehicle to stop.

13 Claims, 4 Drawing Sheets

(51) Int. Cl.
  *B60R 1/12*   (2006.01)
  *B60W 60/00*  (2020.01)
  *G06V 20/56*  (2022.01)

(52) U.S. Cl.
  CPC .... *G06V 20/588* (2022.01); *B60R 2001/1223* (2013.01); *B60W 60/00253* (2020.02); *B60W 2420/42* (2013.01); *B60W 2540/215* (2020.02); *B60W 2552/00* (2020.02); *B60W 2556/45* (2020.02)

(58) Field of Classification Search
  CPC .......... B60W 2556/45; B60W 2420/42; G06V 10/74; G06V 10/40; G06V 20/588; B60R 1/12; B60R 2001/1223
  USPC ............................................................ 701/28
  See application file for complete search history.

(56) References Cited

U.S. PATENT DOCUMENTS

| | | | |
|---|---|---|---|
| 2014/0218521 A1* | 8/2014 | Tanaka | H04N 7/18 348/148 |
| 2017/0043720 A1* | 2/2017 | Shaw | G06V 20/58 |
| 2017/0132482 A1 | 5/2017 | Kim et al. | |
| 2019/0295413 A1 | 9/2019 | Hase et al. | |
| 2019/0308616 A1 | 10/2019 | Jie et al. | |
| 2020/0079359 A1 | 3/2020 | Tsujino et al. | |
| 2020/0089973 A1* | 3/2020 | Efland | B60W 30/06 |
| 2020/0101984 A1 | 4/2020 | Takahashi | |
| 2020/0223439 A1 | 7/2020 | Sakai et al. | |
| 2020/0269833 A1 | 8/2020 | Hayakawa et al. | |

FOREIGN PATENT DOCUMENTS

| | | | | |
|---|---|---|---|---|
| CN | 108121944 | A | 6/2018 | |
| CN | 108284831 | A | 7/2018 | |
| CN | 109017767 | A | 12/2018 | |
| CN | 109658721 | A | 4/2019 | |
| CN | 110576852 | A | 12/2019 | |
| CN | 110588273 | A | 12/2019 | |
| CN | 110588638 | A | 12/2019 | |
| CN | 110753646 | A | 2/2020 | |
| CN | 110884486 | A | 3/2020 | |
| CN | 110901631 | A | 3/2020 | |
| CN | 111079586 | A | 4/2020 | |
| CN | 111142519 | A | 5/2020 | |
| CN | 111231945 | A | 6/2020 | |
| CN | 111367452 | A | 7/2020 | |
| CN | 111391861 | A | 7/2020 | |
| CN | 111674389 | | * 9/2020 | |
| CN | 111762152 | A | 10/2020 | |
| CN | 112068566 | A | 12/2020 | |
| JP | 2019168370 | A | 10/2019 | |
| JP | 2020040441 | A | 3/2020 | |
| JP | 2020093575 | A | 6/2020 | |
| JP | 2020111223 | A | 7/2020 | |
| KR | 101850795 | B1 | 4/2018 | |
| KR | 20190085545 | A | 7/2019 | |
| WO | 2019069430 | A1 | 4/2019 | |
| WO | WO-2019223737 | A1 | * 11/2019 | .......... G05B 19/042 |

OTHER PUBLICATIONS

First Office Action, from Japanese Patent Office, issued to JP Application No. 2021179388 dated Dec. 6, 2022, 14 pages.

First Office Action, from Korean Intellectual Property Office, issued to KR Application No. 10-2021-0079352 dated Jan. 25, 2023, 11 pages.

Extended European Search Report, issued from the European Patent Office, to EP Application No. 21206274.9 dated Mar. 17, 2022, 9 pages.

First Office Action, from The State Intellectual Property Office of the People's Republic of China, issued to CN Application No. 202011481005.2 dated Oct. 8, 2021, 22 pages.

* cited by examiner

METHOD AND APPARATUS OF CONTROLLING DRIVERLESS VEHICLE AND ELECTRONIC DEVICE

CROSS REFERENCE OF RELATED APPLICATION

This application claims a priority to Chinese Patent Application No. 202011481005.2 filed on Dec. 15, 2020, the disclosures of which are incorporated in their entirety by reference herein.

TECHNICAL FIELD

The present disclosure relates to the field of artificial intelligence technologies, such as computer vision and self-driving, of computer technologies, in particular to a method of controlling a driverless vehicle, an apparatus of controlling a driverless vehicle and an electronic device.

BACKGROUND

With the continual development of self-driving technologies, driverless vehicles, such as driverless bus and driverless taxi, are more and more common, and are more and more intelligent.

Conventionally, a driverless vehicle on the move often adheres to a fixed stop location (e.g., the driverless bus has fixed stop locations) according to positioning, and stops directly at the fixed location, or the driverless vehicle stops directly under an instruction inputted by a passenger in the driverless vehicle.

SUMMARY

The present disclosure provides a method of controlling a driverless vehicle, an apparatus of controlling a driverless vehicle and an electronic device.

In a first aspect, an embodiment of the present disclosure provides a method of controlling a driverless vehicle, including:

in a case that a stop instruction is received or the driverless vehicle arrives at a preset position, acquiring a first road surface image captured by a camera of the driverless vehicle that is on a same side of a door of the driverless vehicle;

acquiring, based on the first road surface image, a target road surface state of road surface on one or two sides of the driverless vehicle that are provided with a door;

in a case that the target road surface state is a first road surface state, controlling the driverless vehicle to stop.

In the method of controlling the driverless vehicle of this embodiment, in a case that a stop instruction is received or a driverless vehicle arrives at a preset position, a first road surface image captured by a camera of the driverless vehicle that is on a same side of a door of the driverless vehicle needs to be acquired, then a target road surface state of road surface on one or two sides of the driverless vehicle that are provided with a door is acquired by using the first road surface image, and the driverless vehicle is controlled to stop in the case that the target road surface state is the first road surface state. That is, in this embodiment, in the case that the stop instruction is received or the driverless vehicle arrives at the preset position, a road surface condition of road surface on one or two sides of the driverless vehicle further needs to be acquired, and determination, according to the road surface condition, as to whether to stop refers to controlling the driverless vehicle to stop when the target road surface state is the first road surface state. In this way, the road surface condition in the case that the stop instruction is received or the driverless vehicle arrives at the preset position is considered in the process of vehicle stop control, thus the vehicle stop control effect may be improved.

In a second aspect, an embodiment of the present disclosure provides an apparatus of controlling a driverless vehicle, including:

a first acquisition module, configured to, in a case that a stop instruction is received or the driverless vehicle arrives at a preset position, acquire a first road surface image captured by a camera of the driverless vehicle that is on a same side of a door of the driverless vehicle;

a second acquisition module, configured to acquire, based on the first road surface image, a target road surface state of road surface on one or two sides of the driverless vehicle that are provided with a door;

a first control module, configured to, in a case that the target road surface state is a first road surface state, control the driverless vehicle to stop.

In a third aspect, an embodiment of the present disclosure further provides an electronic device, including:

at least one processor; and a storage communicatively connected to the at least one processor, wherein the storage stores therein an instruction configured to be executed by the at least one processor, and the at least one processor is configured to execute the instruction, to implement the method of controlling the driverless vehicle provided in the embodiments of the present disclosure.

In a fourth aspect, an embodiment of the present disclosure further provides a non-transitory computer readable storage medium, storing therein a computer instruction, wherein the computer instruction is configured to be executed by a computer, to implement the method of controlling the driverless vehicle provided in the embodiments of the present disclosure.

In a fifth aspect, an embodiment of the present disclosure provides a computer program product, comprising a computer program, wherein the computer program is configured to be executed by a processor, to implement the method of controlling the driverless vehicle provided in the embodiments of the present disclosure.

BRIEF DESCRIPTION OF THE DRAWINGS

The accompany drawings are solely for the purpose of explanation of the present disclosure and in no way limit the application.

DETAILED DESCRIPTION

The exemplary embodiments of the present disclosure are described hereinafter with reference to accompany drawings. The details of embodiments of the present disclosure provided in the description are provided to facilitate understanding and are only intended to be exemplary. Those of ordinary skill in the art will appreciate that modifications or replacements may be made in the described embodiments without departing from the scope and spirit of the present disclosure. Further, for clarity and conciseness, descriptions of known functions and structures are omitted.

Figure 1:
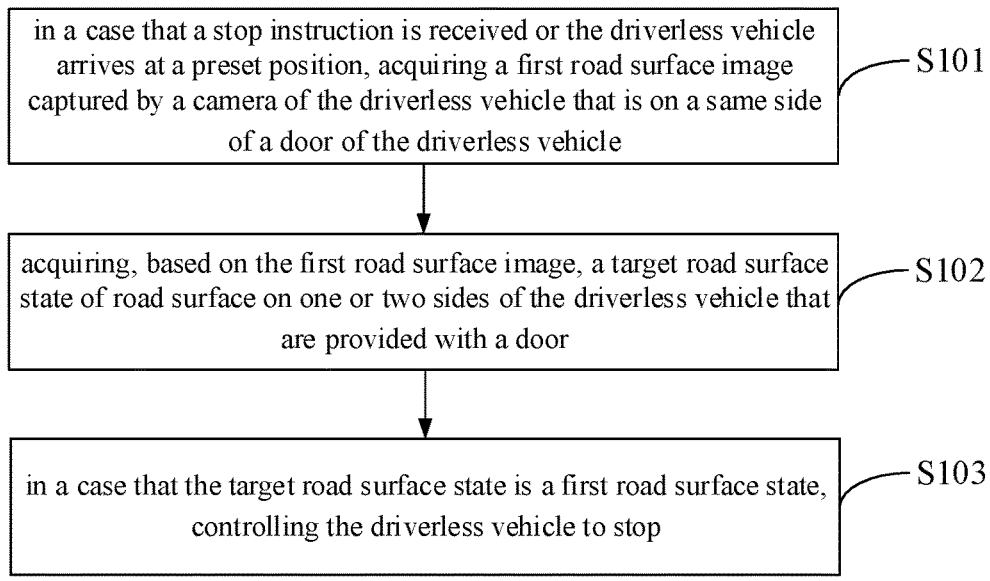
FIG. 1 is a first flow diagram of a method of controlling a driverless vehicle according to an embodiment of the present disclosure.

As shown in FIG. 1, according to an embodiment of the present disclosure, a method of controlling a driverless vehicle is provided. The method may be applied to an electronic device, which may include a head unit or the like, in the driverless vehicle. The method includes the following steps S101 to S103.

Step S101: in a case that a stop instruction is received or the driverless vehicle arrives at a preset position, acquiring a first road surface image captured by a camera of the driverless vehicle that is on a same side of a door of the driverless vehicle.

The stop instruction may be inputted by a user (e.g., a passenger in the driverless vehicle, or the like) in a display interface of an electronic device, may be inputted by voice, may be inputted by text, may be generated by the electronic device in response to an operation of a control button in the display interface, or the like. Having received the stop instruction, the electronic device may prepare for stopping. The determination as to whether to stop needs to be made based on the first road surface image captured at the current position by the camera of the driverless vehicle that is on a same side of a door of the driverless vehicle and the actual condition of subsequently detected road surface. In another example, the electronic device stores therein multiple preset positions of the driverless vehicle in advance, and may prepare for stopping at each of the multiple preset positions. The determination as to whether to stop needs to be made based on the first road surface image captured at the current position by the camera of the driverless vehicle that is on a same side of a door of the driverless vehicle and the actual condition of subsequently detected road surface. In this embodiment, the driverless vehicle is provided externally with a camera, and the camera is on a same side of a door of the driverless vehicle, so as to capture images of road surface on one or two sides of the driverless vehicle that are provided with a door.

It is noted, the driverless vehicle is provided with a camera on one or two sides of the driverless vehicle that are equipped with a door. For example, if the camera is provided on one side of the vehicle that is equipped with a door, the amount of cameras may be one. Alternatively, if the driverless vehicle is equipped with a door on two sides, and a camera is provided on both sides, then the amount of cameras may be two. As such, the aforementioned first road surface image may be a road surface image of road surface on one side of the vehicle, or the first road surface image includes road surface images of road surface on two sides of the vehicle.

Step S102: acquiring, based on the first road surface image, a target road surface state of road surface on one or two sides of the driverless vehicle that are provided with a door.

The target road surface state of road surface on one or two sides of the driverless vehicle may be acquired by using the first road surface image. The target road surface state may be construed as a road surface identification result derived from identification performed on the first road surface image, and the road surface identification result may include: the road surface is suitable for stop or the road surface is not suitable for stop. That is, the target road surface state may include a state suitable for stop and a state not suitable for stop. In other words, the target road surface state represents whether road surface is suitable for stopping the vehicle. It is noted, the state suitable for stop corresponds to the road surface identification result that the road surface is suitable for stop, that is, the road surface is in good condition and suitable for stopping the vehicle. In other words, the state represents that the road surface is suitable for stop and it is convenient for the passenger to get off the vehicle. The state not suitable for stop corresponds to the road surface identification result that the road surface is not suitable for stop, that is, the road surface is in poor condition and not suitable for stopping the vehicle, e.g., the road surface has a pit, is muddy, is flooded, or the like. In other words, the state represents that the road surface is not suitable for stop.

Step S103: in a case that the target road surface state is a first road surface state, controlling the driverless vehicle to stop.

The first road surface state may be construed as the state suitable for stop. The target road surface state being the first road surface state represents that, in current position, the road surface on one or two sides of the driverless vehicle is in good condition and suitable for stopping the vehicle, and it is convenient for the passenger to get off the vehicle. At this time, the driverless vehicle is controlled to stop.

In the method of controlling the driverless vehicle of this embodiment, in a case that a stop instruction is received or a driverless vehicle arrives at a preset position, a first road surface image captured by a camera of the driverless vehicle that is on a same side of a door of the driverless vehicle needs to be acquired, then a target road surface state of road surface on one or two sides of the driverless vehicle that are provided with a door is acquired by using the first road surface image, and the driverless vehicle is controlled to stop in the case that the target road surface state is the first road surface state. That is, in this embodiment, in the case that the stop instruction is received or the driverless vehicle arrives at the preset position, a road surface condition of road surface on one or two sides of the driverless vehicle further needs to be acquired, and determination, according to the road surface condition, as to whether to stop refers to controlling the driverless vehicle to stop when the target road surface state is the first road surface state. In this way, the road surface condition in the case that the stop instruction is received or the driverless vehicle arrives at the preset position is considered in the process of vehicle stop control, thus the vehicle stop control effect may be improved. Since the vehicle is controlled to stop according to the forgoing process, it is convenient for a user to get off the vehicle on the road surface where the vehicle stops.

In an embodiment, the camera is mounted on a rear view mirror of the driverless vehicle and is configured to capture a road surface image of road surface on a side of the driverless vehicle.

The rear view mirror is provided on opposite sides of the driverless vehicle (i.e., there are two rear view mirrors which may be mounted on the vehicle doors) and is installed with a camera which can be configured to capture images of road surface on a side of the driverless vehicle. In this way, the condition of road surface on a side of the driverless vehicle may be determined based on the first road surface image captured by the camera, to facilitate the subsequent vehicle stop control according to road surface condition on a side of the driverless vehicle, and improve vehicle stop control effect. In an example, the rear view mirror includes a rear view mirror body (equipped with a mirror and the like) and a bracket which are connected to each other. The rear view mirror body is mounted on a vehicle door via the bracket. The camera may be installed on the bracket and below the rear view mirror body, and directed along a direction from the rear view mirror body to the ground, to facilitate the capture of images of road surface on the side.

Figure 2:
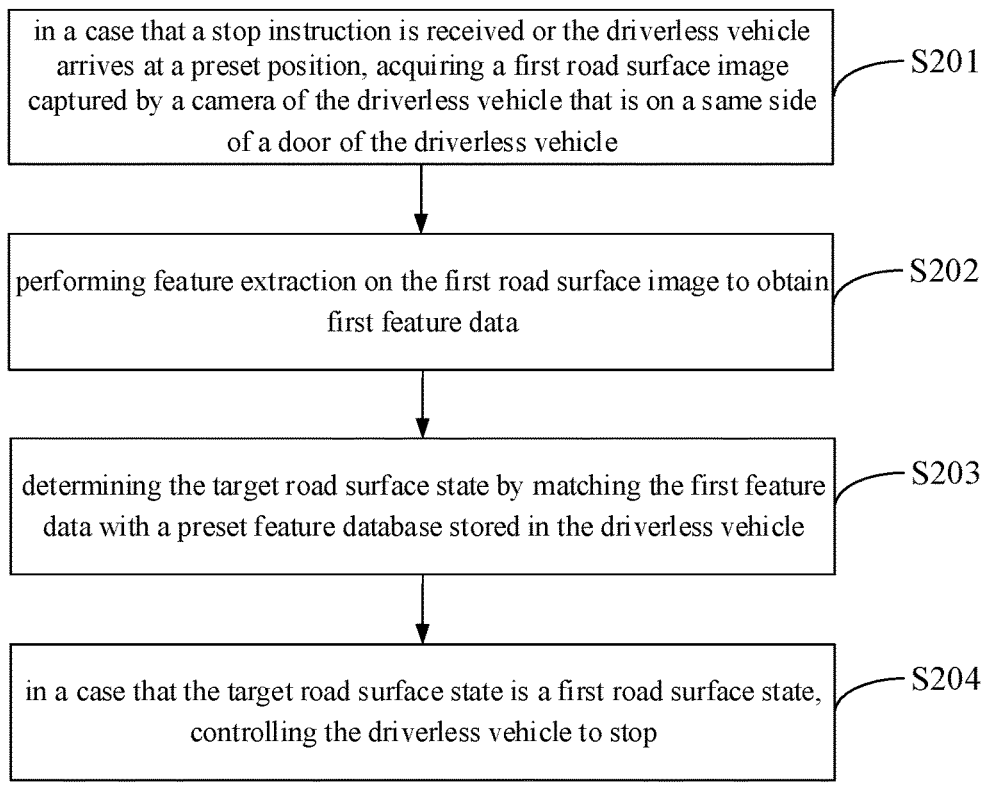
FIG. 2 is a second flow diagram of a method of controlling a driverless vehicle according to an embodiment of the present disclosure.

In an embodiment, the acquiring, based on the first road surface image, the target road surface state of road surface on one or two sides of the driverless vehicle that are provided with the door includes: performing feature extraction on the first road surface image to obtain first feature data; determining the target road surface state by matching the first feature data with a preset feature database stored in the driverless vehicle. That is, in the embodiment, as shown in FIG. 2, a method of controlling a driverless vehicle according to an embodiment is provided. The method includes following steps S201 to S204.

Step S201: in a case that a stop instruction is received or the driverless vehicle arrives at a preset position, acquiring a first road surface image captured by a camera of the driverless vehicle that is on a same side of a door of the driverless vehicle.

Step S202: performing feature extraction on the first road surface image to obtain first feature data.

Step S203: determining the target road surface state by matching the first feature data with a preset feature database stored in the driverless vehicle.

Step S204: in a case that the target road surface state is a first road surface state, controlling the driverless vehicle to stop.

The step S201 corresponds to the step S101, and the step S204 corresponds to the step S103, which are not described in detail herein.

In this embodiment, the determination of the target road surface state may be performed by the vehicle locally. That is, feature extraction is performed on the first road surface image to obtain first feature data; and then the target road surface state is determined by matching the first feature data with the preset feature database stored in advance in the driverless vehicle (the preset feature data may be stored in an electronic device of the vehicle, e.g., head unit). It is noted, the preset feature database includes feature data of a plurality of road surface images, and the feature data is of a same type as the first feature data. For example, the feature data of road surface image in the preset feature database includes data of feature A and feature B of the road surface image and the like, then feature extraction of the feature A and feature B is performed on the first road surface image to obtain first feature data which includes data of feature A and feature B of the first road surface image. As an example, the determining the target road surface state by matching the first feature data with a preset feature database stored in the driverless vehicle may be construed as determining the target road surface state by performing similarity match between the first feature data and the feature data in the preset feature database. It is noted, the plurality of road surface images in the preset feature database are a plurality of images of road surface not suitable for stop, which are images accumulated in the past of road surface concluded to be not suitable for stop.

In this embodiment, the target road surface state is determined by matching the first feature data with the preset feature database stored locally in the driverless vehicle, thus the efficiency of determination of the target road surface state may be improved, and the efficiency of vehicle stop control is improved.

In an example, it may be that the feature extraction is performed on the first road surface image to obtain first feature data and the target road surface state is determined by matching the first feature data with a preset feature database stored in the driverless vehicle in the case that the driverless vehicle has no access to a network (i.e., the driverless vehicle is not connected to a network, which may be construed as being in an offline state). In other words, when no network is available, the driverless vehicle determines the target road surface state locally, to improve the efficiency of determination of the target road surface state, and the efficiency of vehicle stop control.

In an embodiment, the determining the target road surface state by matching the first feature data with the preset feature database stored in the driverless vehicle includes:

in a case that the preset feature database does not include a target feature data matching the first feature data, determining that the target road surface state is a first road surface state; or, in a case that the preset feature database includes a target feature data matching the first feature data, determining that the target road surface state is a second road surface state.

The first road surface state is a state suitable for stop, and the second road surface state is a state not suitable for stop. In the case that the preset feature database includes a target feature data matching the first feature data, it is determined that the target road surface state is the second road surface state, which means that the condition of road surface on the side of the driverless vehicle in the current position is not suitable for stopping the vehicle, and it is necessary to further judge whether to stop. In the case that the preset feature database does not include a target feature data matching the first feature data, it is determined that the target road surface state is the first road surface state, which means that the condition of road surface on the side of the driverless vehicle in the current position is suitable for stopping the vehicle. At this time, the vehicle may be controlled to stop, thus the accuracy and effect of the vehicle stop control is improved.

As an example, the target feature data matching the first feature data may be construed as the target feature data having a similarity match with the first feature data. A similarity match means that the similarity is greater than a preset similarity. For example, the determining that the target road surface state is a first road surface state in the case that the preset feature database does not include a target feature data matching the first feature data may include: in the case that the preset feature database does not include a target feature data having a similarity with the first feature data that is greater than a preset similarity, it is determined that the target road surface state is the first road surface state. The determining that the target road surface state is a second road surface state in the case that the preset feature database includes a target feature data matching the first feature data may include: in the case that the preset feature database includes a target feature data having a similarity with the first feature data that is greater than the preset similarity, it is determined that the target road surface state is the second road surface state.

In an embodiment, the acquiring, based on the first road surface image, the target road surface state of road surface on one or two sides of the driverless vehicle that are provided with the door includes:

transmitting the first road surface image to a cloud server;

receiving the target road surface state transmitted by the cloud server and obtained from identification performed by the cloud server on the first road surface image by using a road surface state identification model, where the target road surface state includes a first road surface state or a second road surface state.

In the embodiment, the cloud server performs identification on the first road surface image by using the road surface state identification model to obtain the target road surface state. The target road surface state characterizes the condition of road surface on the side of the driverless vehicle, and may be a first road surface state suitable for stop or a second road surface state not suitable for stop. The target road surface state may be received from the cloud server. The target road surface state is obtained by the cloud server by performing identification using the road surface state identification model, thus the accuracy of target road surface state may be improved, and the accuracy of vehicle stop control is improved.

As an example, it may be that the driverless vehicle while being in connection with a network (i.e., in an on line state) transmits the first road surface image to the cloud server, and the cloud server performs identification on the first road surface image by using the road surface state identification model to obtain the target road surface state. In other words, when a network is available, the target road surface state is obtained by the cloud server by performing identification using the road surface state identification model, thus the accuracy of target road surface state may be improved, and the accuracy of vehicle stop control is improved.

As an example, the road surface state identification model is a trained model, and may include, but is not limited to, a neural network and the like. For example, prior to the performing identification on the first road surface image by using the road surface state identification model to obtain the target road surface state, the cloud server may train the model with data samples (including a plurality of sample road surface images and real road surface states corresponding to the sample road surface images) to obtain the road surface state identification model. Additionally, after the performing identification on the first road surface image by using the road surface state identification model to obtain the target road surface state, the cloud server may annotate the states of the first road surface images uploaded by multiple driverless vehicles within a preset historical time period, to obtain the real road surface states of the first road surface images uploaded by the multiple driverless vehicles, and retrain the road surface state identification model by using the first road surface images uploaded by the multiple driverless vehicles and corresponding real road surface states, to update the road surface state identification model, thereby improving the identification accuracy of the road surface state identification model.

In an embodiment, after the acquiring, based on the first road surface image, the target road surface state of road surface on one or two sides of the driverless vehicle that are provided with the door, the method further includes: in a case that the target road surface state is a second road surface state, outputting a first prompt message, wherein the first prompt message is configured to prompt that current road surface is not suitable for stop; in a case that a first input is received from a user, controlling the driverless vehicle to stop.

In a case that the target road surface state is the second road surface state, it is necessary to continue to judge whether to stop. In this case, the first prompt message may be outputted, to prompt the user that current road surface is not suitable for stop. The user may select whether to stop the vehicle according to the prompt, and if the user makes first input, the driverless vehicle is controlled to stop. In other words, even if the current road surface is not suitable for stop, a selection can be asked of the user, and if the user selects to stop the vehicle, the driverless vehicle is controlled to stop, so as to satisfy user's demand and improve user experience. As an example, the outputting the first prompt message may be voice playing of the first prompt message and the like, so that the user can receive the first prompt message in time.

As an example, the first input may be voice input, text input, a press on a stop driving button in the display interface of the electronic device or the like. That is, the user may perform the first input in different input manners, so as to satisfy user's demand for different input manners, thereby improving user experience.

In an embodiment, in a case that the target road surface state is a second road surface state, after outputting the first prompt message, the method further includes: in a case that a second input is received from a user, controlling the driverless vehicle to keep moving; in a case that a current time reaches a first time or a distance between a position of the driverless vehicle and a position where the second input is received reaches a preset distance, controlling the camera to capture a second road surface image, updating the first road surface image to the second road surface image, and returning to the step of determining, based on the first road surface image, the target road surface state of road surface on a side of the driverless vehicle that is provided with the door, until the driverless vehicle stops; wherein, a time difference between the first time and a time when the second input is received is less than a preset time length.

That is, in the case that the second input is received from the user, the vehicle keeps moving to look for the road surface suitable for stop. In the case that the preset time length expires or the preset distance is traversed, the camera may be controlled to capture image again to obtain the second road surface image. The first road surface is updated to the second road surface image. The process returns to the step of determining, based on the first road surface image, the target road surface state of road surface on a side of the driverless vehicle that is provided with the door, to continue the judgement of road surface state and continue the vehicle control process according to the target road surface state, until the driverless vehicle stops. By means of the forgoing loop process, next target road surface state suitable for stop may be found to control the driverless vehicle to stop, or in the case that the target road surface state is not suitable for stop, the driverless vehicle is controlled by the first input of the user to stop. Additionally, as an example, the controlling the driverless vehicle to keep moving in the case that the second input is received from the user may include: in the case that the second input is received from the user, if the number of times the second input is received is less than a preset number of times (e.g., twice), the driverless vehicle is controlled to keep moving. In the case that the second input is received from the user, if the number of times the second input is received is greater than or equal to the preset number of times, the driverless vehicle is controlled to stop and move no more, so as to reduce the occurrence of inefficiency of vehicle stop due to too many loops. It is noted, the number of times the second input is received refers to a sum of the number of times the second input of the user is received after the first prompt message is outputted when the target road surface state is the second road surface state before the current reception of the second input and the current reception of the second input.

As an example, the second input may be voice input, text input, a press on a stop driving button in the display interface of the electronic device or the like. That is, the user may perform the second input in different input manners, so as to satisfy user's demand for different input manners, thereby improving user experience.

A control process of the foregoing method of controlling the driverless vehicle is described in detail below with reference to a specific embodiment. By way of example, the method of controlling the driverless vehicle is applied to a head unit.

Figure 3:
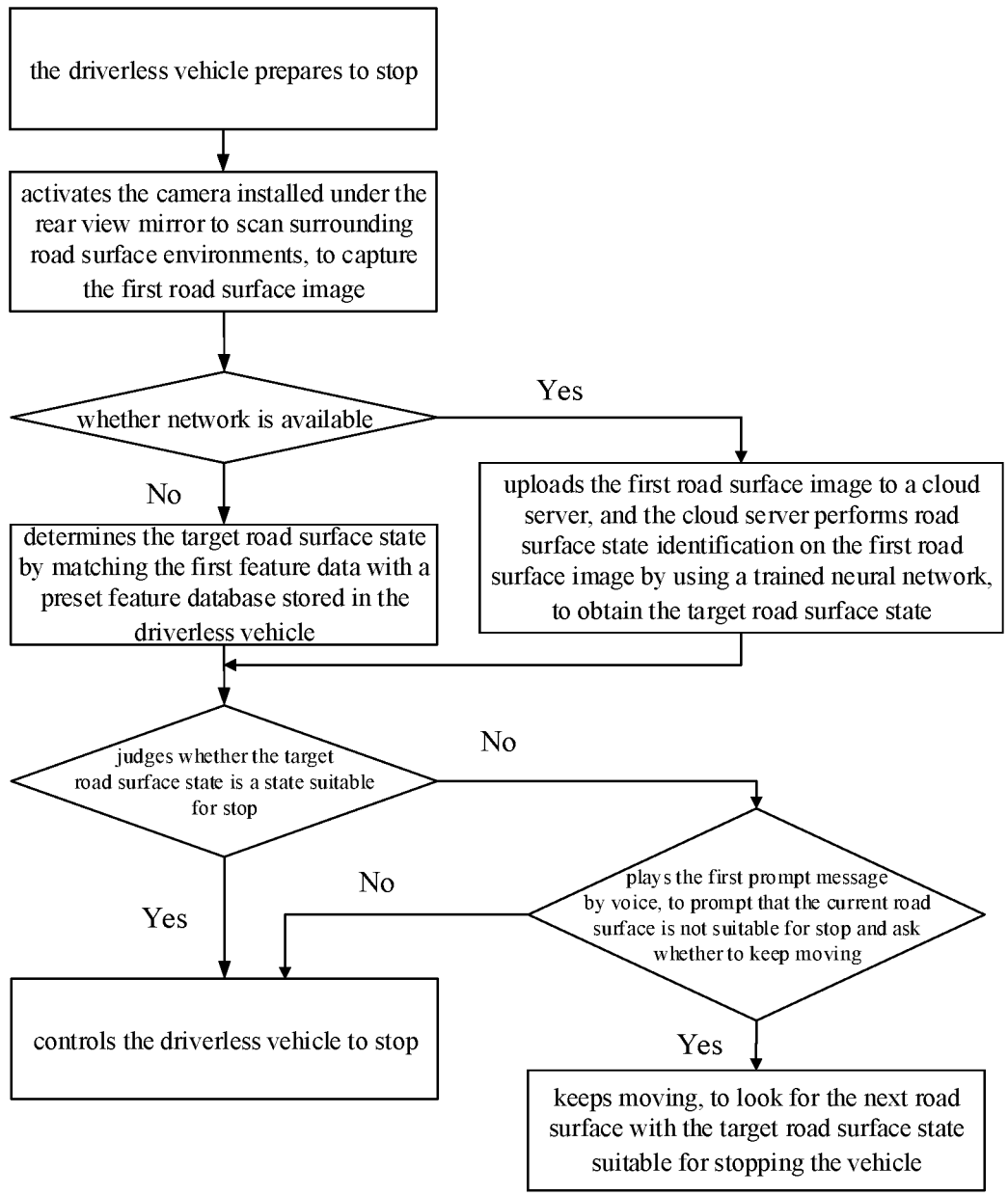
FIG. 3 is a third flow diagram of a method of controlling a driverless vehicle according to an embodiment of the present disclosure.

The driverless vehicle is a vehicle supporting 360 degrees surround view park assist, and is installed with a camera on both left and right rear view mirrors. As shown in FIG. 3, firstly, in a case that a stop instruction is received or the driverless vehicle arrives at a preset position, a driverless vehicle stop preparation state is entered. At this time, the cameras installed on the rear view mirrors (e.g., installed on the bracket of the rear view mirror and located below the rear view mirror body) may be activated to scan surrounding road surface environments, to capture the first road surface image. The head unit then may acquire the first road surface image of road surface on the side of the driverless vehicle in the current position.

Next, it is detected whether the head unit is connected to a network. If the head unit has no access to a network, i.e., the head unit is not connected to a network, the head unit performs a road surface judgement based on a preset feature database. That is, the target road surface state is determined by matching the first feature data with the preset feature database stored in the driverless vehicle. It is judged whether the target road surface state is a state suitable for stop. In a case that the preset feature database does not include the target feature data matching the first feature data, it is determined that the target road surface state is the first road surface state, i.e., a state suitable for stop, at this time, the driverless vehicle is controlled to stop. In a case that the preset feature database includes the target feature data matching the first feature data, it is determined that the target road surface state is the second road surface state, i.e., a state not suitable for stop, at this time, the first prompt message may be played by voice, to prompt that the current road surface is not suitable for stop and ask whether to keep moving. If the user makes the first input (e.g., the user replies with a "no"), that is, the user chooses to stop, the driverless vehicle is controlled to stop; if the user makes the second input (e.g., the user replies with a "yes"), that is, the user chooses to keep moving, the driverless vehicle is controlled to keep moving to look for the next road surface with the target road surface state suitable for stopping the vehicle.

If the head unit has access to a network, i.e., the head unit is connected to a network, the head unit uploads the first road surface image to a cloud server. The cloud server performs road surface state identification on the first road surface image by using a trained neural network, that is, identifies whether road surface in the first road surface image is good road surface (i.e., whether the road surface is suitable for stop), to obtain the target road surface state, and transmits the target road surface state to the head unit. The head unit receives the target road surface state transmitted by the cloud serve and judges whether the target road surface state is a state suitable for stop. In the case that the target road surface state is the first road surface state, i.e., a state suitable for stop, the driverless vehicle is controlled to stop. In the case that the target road surface state is the second road surface state, i.e., a state not suitable for stop, the first prompt message may be played by voice, to prompt that the current road surface is not suitable for stop and ask whether to keep moving. If the user makes the first input, that is, the user chooses to stop, the driverless vehicle is controlled to stop; if the user makes the second input, that is, the user chooses to keep moving, the driverless vehicle is controlled to keep moving to look for the next road surface with the target road surface state suitable for stopping the vehicle.

The method of controlling a driverless vehicle according to the embodiment may further improve the functions in the field related to self-driving, and makes use of cameras currently mounted on the vehicle, dispensing with the additional installation of hardware devices. The foregoing process is configured to perform road surface identification. The determination as to whether to stop is based on the acquired target road surface state. The vehicle is not stopped directly, rather, the determination as to whether to stop needs to consider the road surface condition when a stop instruction is received or the driverless vehicle arrives at a preset position. In this way, the vehicle stop control effect and the like may be improved.

Figure 4:
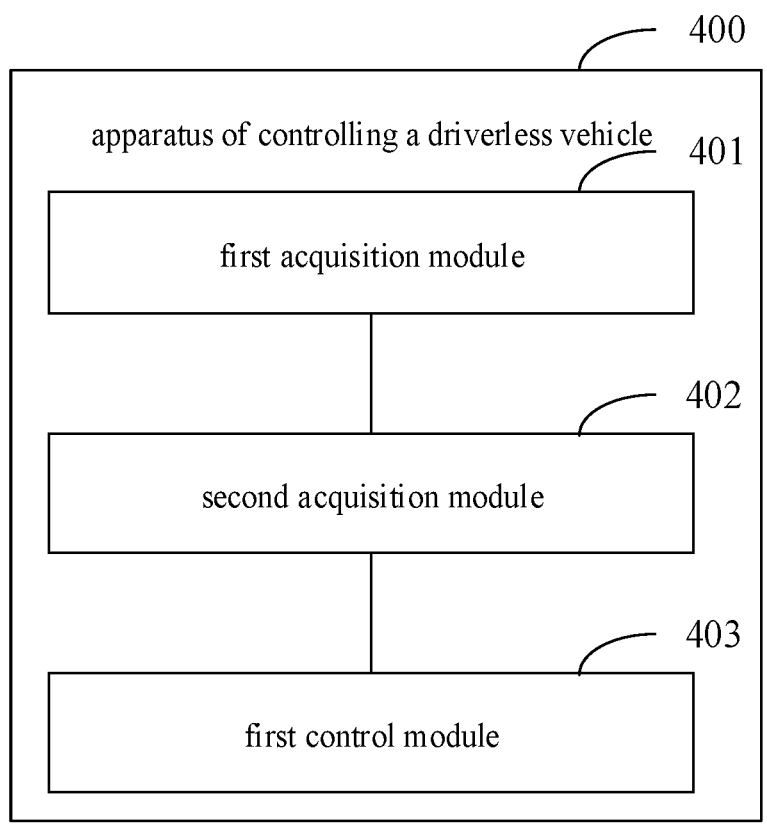
FIG. 4 is a structural diagram of an apparatus of controlling a driverless vehicle according to an embodiment of the present disclosure.

As shown in FIG. 4, according to an embodiment of the present disclosure, an apparatus 400 for controlling a driverless vehicle is provided. The apparatus may be applied to an electronic device, which may include a head unit or the like, in the driverless vehicle. The apparatus 400 includes:
  a first acquisition module 401, configured to, in a case that a stop instruction is received or the driverless vehicle arrives at a preset position, acquire a first road surface image captured by a camera of the driverless vehicle that is on a same side of a door of the driverless vehicle;
  a second acquisition module 402, configured to acquire, based on the first road surface image, a target road surface state of road surface on one or two sides of the driverless vehicle that are provided with a door;
  a first control module 403, configured to, in a case that the target road surface state is a first road surface state, control the driverless vehicle to stop.

In an embodiment, the camera is mounted on a rear view mirror of the driverless vehicle and is configured to capture a road surface image of road surface on a side of the driverless vehicle.

Figure 5:
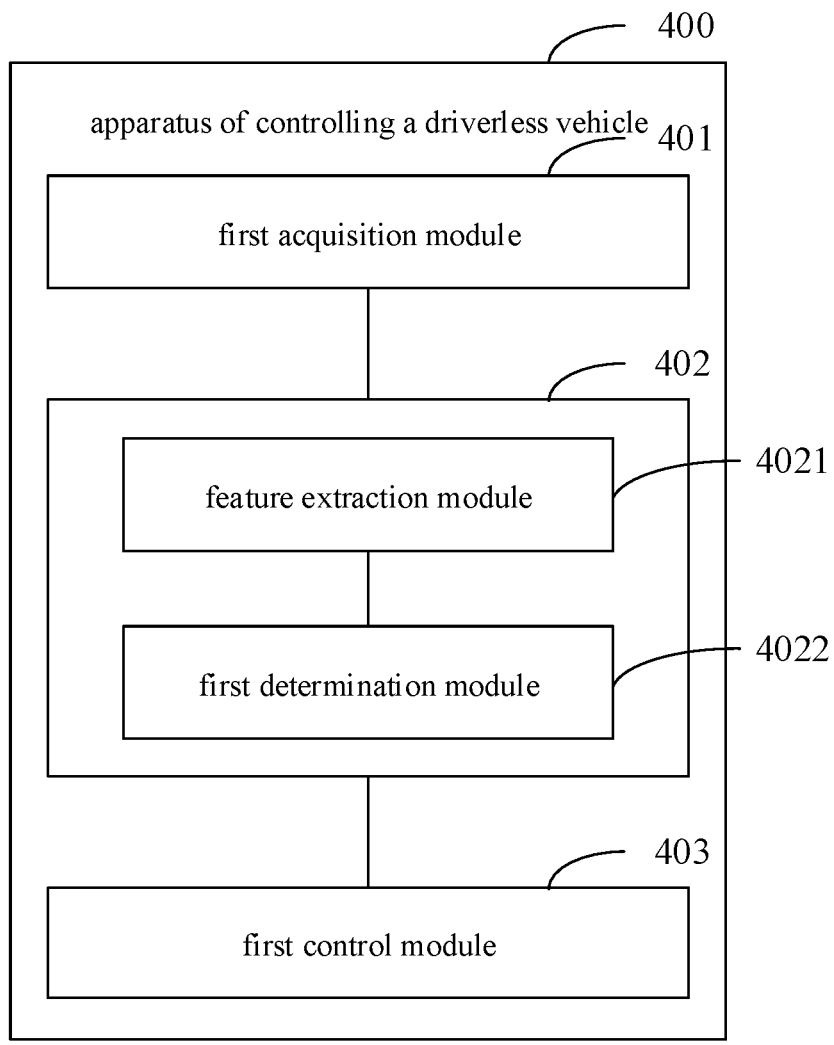
FIG. 5 is another structural diagram of an apparatus of controlling a driverless vehicle according to an embodiment of the present disclosure.

As shown in FIG. 5, in an embodiment, the second acquisition module 402 includes:
  a feature extraction module 4021, configured to perform feature extraction on the first road surface image to obtain first feature data;
  a first determination module 4022, configured to determine the target road surface state by matching the first feature data with a preset feature database stored in the driverless vehicle.

In an embodiment, the determining the target road surface state by matching the first feature data with the preset feature database stored in the driverless vehicle includes:
  in a case that the preset feature database does not include a target feature data matching the first feature data, determining that the target road surface state is a first road surface state; or, in a case that the preset feature database includes a target feature data matching the first feature data, determining that the target road surface state is a second road surface state.

In an embodiment, the second acquisition module includes:

a transmission module, configured to transmit the first road surface image to a cloud server;

a reception module, configured to receive the target road surface state transmitted by the cloud server and obtained from identification performed by the cloud server on the first road surface image by using a road surface state identification model, where the target road surface state includes a first road surface state or a second road surface state.

In an embodiment, the apparatus further includes:

an output module, configured to, in a case that the target road surface state is a second road surface state, output a first prompt message, where the first prompt message is configured to prompt that current road surface is not suitable for stop;

a second control module, configured to, in a case that a first input is received from a user, control the driverless vehicle to stop.

The apparatus of controlling the driverless vehicle according to the embodiments is an apparatus implementing the method of controlling the driverless vehicle according to the foregoing embodiments, and has corresponding technical features and effects, therefore a detailed description thereof is omitted herein.

According to embodiments of the present disclosure, an electronic device, a readable storage medium and a computer program product are further provided.

Figure 6:
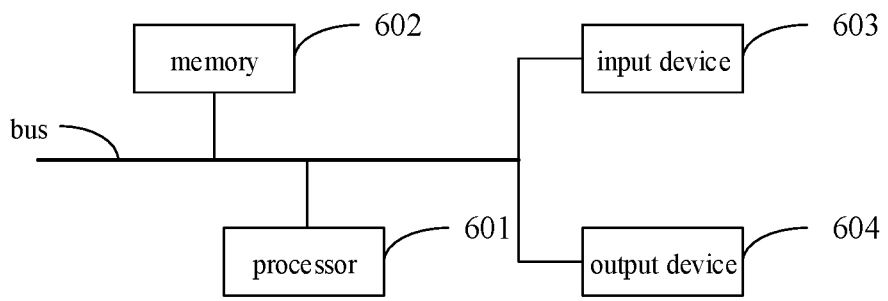
FIG. 6 is a block diagram of an electronic device for implementing the method of controlling the driverless vehicle according to embodiments of the present disclosure.

Referring to FIG. 6, a block diagram of an electronic device configured to implement the method of controlling the driverless vehicle according to embodiments of this application is illustrated. The electronic device is intended to represent various forms of digital computers, such as laptop computer, desktop computer, workstation, personal digital assistant, server, blade server, mainframe and other suitable computers. The components, the connections and relationships therebetween and the functions thereof described herein are merely exemplarily, and are not intended to limit the implementation of this application described and/or claimed herein.

As shown in FIG. 6, the electronic device includes: one or more processors 601, a memory 602, and an interface including a high speed interface and a low speed interface, which is used for connecting various parts. The various parts are interconnected by different buses, and may be installed on a common motherboard or installed in another manner as required. The processor may process instructions configured to be executed in the electronic device, and the instructions include those stored in the memory and used for displaying graphic information of GUI on an external input/output device (e.g., a display device coupled to the interface). In other implementations, if needed, multiple processors and/or multiple buses may be configured together with multiple memories. Similarly, multiple electronic devices may be connected, where each electronic device performs a part of necessary operations (e.g., in a server array, a group of blade servers, or a multi-processor system). FIG. 6 illustrates a single processor 601 as an example.

The memory 602 is the non-transitory computer readable storage medium according to the present disclosure. The memory stores instructions configured to be executed by at least one processor, so that the at least one processor implements the method of controlling the driverless vehicle according to the present disclosure. The non-transitory computer readable storage medium according to the present disclosure stores computer instructions configured to be executed by a computer to implement the method of controlling the driverless vehicle according to the present disclosure.

The computer program product according to an embodiment of the present disclosure includes a computer program, and the computer program is configured to cause the computer to implement the method of controlling the driverless vehicle provided by the embodiments of the present disclosure.

As a non-transitory computer readable storage medium, the memory 602 may be configured to store non-transitory software program, non-transitory computer executable program and module, such as the program instruction/module corresponding to the method of controlling the driverless vehicle according to some embodiments of the present disclosure (e.g., the first acquisition module 401, the second acquisition module 402 and the first control module 403 shown in FIG. 4). The processor 601 is configured to perform various functional applications and data processing of the server, that is, to implement the method of controlling the driverless vehicle according to the foregoing method embodiments, by running non-transitory software program, instruction and module stored in the memory 602.

The memory 602 may include a program storage zone and a data storage zone. The program storage zone may store an operating system, and an application program required for at least one function. The data storage zone may store data and the like created according to the usage of the foregoing electronic device. Further, the memory 602 may include a high speed random access memory, or a non-transitory storage, e.g., at least one magnetic disk storage device, a flash memory device, or other non-transitory solid-state storage device. In some embodiments, the memory 602 optionally includes a memory located remote to the processor 601. These remote memories may be connected to the foregoing electronic device via a network. For example, the network includes, but is not limited to: Internet, intranet, local area network (LAN), mobile communication network or a combination thereof.

The electronic device may further include: an input device 603 and an output device 604. The processor 601, the memory 602, the input device 603 and the output device 604 may be connected by a bus or in other manner. In FIG. 6, a connection by bus is illustrated as an example.

The input device 603 may receive inputted numeric or character information, and generate key signal inputs related to the user settings and functional control of the foregoing electronic device. The input device 603 may be, for example, a touch screen, keypad, mouse, trackpad, touchpad, indication rod, one or more mouse buttons, trackball, joystick, or the like. The output device 604 may include a display device, auxiliary lighting device (e.g., an LED), tactile feedback device (e.g., a vibration motor) and the like. The display device may include, but is not limited to, a liquid crystal display (LCD), light-emitting diode (LED) display and plasma display. In some implementations, the display device may be a touch screen.

The various implementations of the system and technique described herein may be implemented in a digital electronic circuit system, integrated circuit system, application specific integrated circuit (ASIC), computer hardware, firmware, software and/or a combination thereof. The implementations may include: the system and technique are implemented in one or more computer programs configured to be executed and/or interpreted by a programmable system including at least one programmable processor. The programmable processor may be a special purpose or general purpose programmable processor, and may receive data and instructions from a storage system, at least one input device and at least one output device, and transmit data and instructions to the storage system, the at least one input device and the at least one output device.

The computer program (also known as program, software, software application, or code) includes machine instructions for programmable processor, and may be implemented by using procedural and/or object-oriented programming languages and/or assembly/machine languages. As used herein, the terms "machine readable medium" and "computer readable medium" refer to any computer program product, device and/or apparatus (e.g., a magnetic disk, optical disc, memory, programmable logic device (PLD)) configured to provide machine instructions and/or data to a programmable processor, and include a machine readable medium receiving machine instructions in the form of machine readable signals. The term "machine readable signal" refers to any signal configured to provide machine instructions and/or data to a programmable processor.

To provide for interactions with users, the system and technique described herein may be implemented in the computer. The computer is provided with a display device (e.g., a cathode ray tube (CRT) or liquid crystal display (LCD) display) for displaying information to users, and a keyboard and pointing device (e.g., a mouse or trackball). A user may provide input to the computer through the keyboard and the pointing device. Other types of devices may be provided for the interactions with users, for example, the feedbacks provided to users may be any form of sensory feedbacks (e.g., visual feedback, auditory feedback, or tactile feedback); and the user input may be received in any form (including sound input, voice input or tactile input).

The system and technique described herein may be implemented in a computing system including a background component (e.g., a data server), a computing system including a middleware component (e.g., an application server), a computing system including a front-end component (e.g., a user computer provided with a GUI or web browser by which users may interact with the implementation of the system and technique described herein), or a computing system including any combination of such background component, middleware component or front-end component. The components of the system may be interconnected by digital data communication in any form or medium (e.g., communication network). The communication network includes for example: LAN, wide area network (WAN), and Internet.

The computer system may include a client and a server. Generally, the client and the server are far from each other and interact with each other through a communication network. The client-server relationship is generated by computer programs running on respective computers and having a client-server relation therebetween.

In the technical solution according to embodiments of the present disclosure, in a case that a stop instruction is received or a driverless vehicle arrives at a preset position, a first road surface image captured by a camera of the driverless vehicle that is on a same side of a door of the driverless vehicle needs to be acquired, then a target road surface state of road surface on one or two sides of the driverless vehicle that are provided with a door is acquired by using the first road surface image, and the driverless vehicle is controlled to stop in the case that the target road surface state is the first road surface state. That is, in this embodiment, in the case that the stop instruction is received or the driverless vehicle arrives at the preset position, a road surface condition of road surface on one or two sides of the driverless vehicle further needs to be acquired, and determination, according to the road surface condition, as to whether to stop refers to controlling the driverless vehicle to stop when the target road surface state is the first road surface state. In this way, the road surface condition in the case that the stop instruction is received or the driverless vehicle arrives at the preset position is considered in the process of vehicle stop control, thus the vehicle stop control effect may be improved.

It is understood, various forms of processes as shown above may be used, and steps thereof may rearranged, added or deleted. For example, as long as a desired outcome of the technical solutions disclosed in the present disclosure is achieved, the steps set forth in the present disclosure may be performed in parallel, sequentially, or in a different order, which is not limited herein.

The above specific implementations do not constitute a limitation on the scope of the present disclosure. It is appreciated by those skilled in the art, various modifications, combinations, sub-combinations and replacements may be made according to design requirements or other considerations. Any modification, equivalent replacement and improvement made without departing from the spirit and principle of the present disclosure shall be deemed as falling within the scope of the present disclosure.

What is claimed is:

1. A method of controlling a driverless vehicle, comprising:
in a case that a stop instruction is received or the driverless vehicle arrives at a preset position, acquiring a first road surface image captured by a camera of the driverless vehicle that is on a same side of a door of the driverless vehicle;
acquiring, based on the first road surface image, a target road surface state of a road surface on one or two sides of the driverless vehicle that are provided with the door;
in a case that the target road surface state is a first road surface state, controlling the driverless vehicle to stop;
wherein, after the acquiring, based on the first road surface image, the target road surface state of the road surface on one or two sides of the driverless vehicle that are provided with the door, the method further comprises:
in a case that the target road surface state is a second road surface state, outputting a first prompt message, wherein the first prompt message is configured to prompt that a current road surface is not suitable for stop;
in a case that a second input is received from a user, controlling the driverless vehicle to keep moving;
in a case that a current time reaches a first time, controlling the camera to capture a second road surface image, updating the first road surface image with the second road surface image, and returning to the step of determining, based on the first road surface image, the target road surface state of the road surface on one or two sides of the driverless vehicle that are provided with the door, until the driverless vehicle stops;
wherein, a time difference between the first time and a time when the second input is received is less than a preset time length;
wherein the method further comprises:

when the number of times the second input is received is less than a preset number of times, controlling the driverless vehicle to keep moving;

when the number of times the second input is received is greater than or equal to the preset number of times, controlling the driverless vehicle to stop.

2. The method according to claim 1, wherein the camera is mounted on a rear view mirror of the driverless vehicle and is configured to capture a road surface image of road the surface on a side of the driverless vehicle.

3. The method according to claim 1, wherein the acquiring, based on the first road surface image, the target road surface state of the road surface on one or two sides of the driverless vehicle that are provided with the door comprises:

performing feature extraction on the first road surface image to obtain first feature data;

determining the target road surface state by matching the first feature data with a preset feature database stored in the driverless vehicle.

4. The method according to claim 3, wherein the determining the target road surface state by matching the first feature data with the preset feature database stored in the driverless vehicle comprises:

in a case that the preset feature database does not comprise a target feature data matching the first feature data, determining that the target road surface state is a first road surface state; or, in a case that the preset feature database comprises a target feature data matching the first feature data, determining that the target road surface state is a second road surface state.

5. The method according to claim 1, wherein the acquiring, based on the first road surface image, the target road surface state of the road surface on one or two sides of the driverless vehicle that are provided with the door comprises:

transmitting the first road surface image to a cloud server;

receiving the target road surface state transmitted by the cloud server and obtained from identification performed by the cloud server on the first road surface image by using a road surface state identification model, wherein the target road surface state comprises a first road surface state or a second road surface state.

6. The method according to claim 1, wherein, after the outputting the first prompt message, the method further comprises:

in a case that a first input is received from a user, controlling the driverless vehicle to stop.

7. A non-transitory computer readable storage medium, storing therein a computer instruction, wherein the computer instruction is configured to be executed by a computer, to implement the method according to claim 1.

8. An apparatus of controlling a driverless vehicle, comprising:

at least one processor; and a storage communicatively connected to the at least one processor, wherein the storage stores therein an instruction configured to be executed by the at least one processor, and the at least one processor is configured to execute the instruction to:

in a case that a stop instruction is received or the driverless vehicle arrives at a preset position, acquire a first road surface image captured by a camera of the driverless vehicle that is on a same side of a door of the driverless vehicle;

acquire, based on the first road surface image, a target road surface state of a road surface on one or two sides of the driverless vehicle that are provided with the door;

in a case that the target road surface state is a first road surface state, control the driverless vehicle to stop;

wherein the at least one processor is configured to execute the instruction to:

after the acquiring, based on the first road surface image, the target road surface state of the road surface on one or two sides of the driverless vehicle that are provided with the door, in a case that the target road surface state is a second road surface state, outputting a first prompt message, wherein the first prompt message is configured to prompt that a current road surface is not suitable for stop;

in a case that a second input is received from a user, controlling the driverless vehicle to keep moving;

in a case that a current time reaches a first time, controlling the camera to capture a second road surface image, updating the first road surface image with the second road surface image, and returning to the step of determining, based on the first road surface image, the target road surface state of the road surface on one or two sides of the driverless vehicle that are provided with the door, until the driverless vehicle stops;

wherein, a time difference between the first time and a time when the second input is received is less than a preset time length;

wherein the at least one processor is configured to execute the instruction to:

when the number of times the second input is received is less than a preset number of times, controlling the driverless vehicle to keep moving;

when the number of times the second input is received is greater than or equal to the preset number of times, controlling the driverless vehicle to stop.

9. The apparatus according to claim 8, wherein the camera is mounted on a rear view mirror of the driverless vehicle and is configured to capture a road surface image of road surface on a side of the driverless vehicle.

10. The apparatus according to claim 8, wherein the at least one processor is configured to execute the instruction to:

perform feature extraction on the first road surface image to obtain first feature data;

determine the target road surface state by matching the first feature data with a preset feature database stored in the driverless vehicle.

11. The apparatus according to claim 10, wherein the at least one processor is configured to execute the instruction to:

in a case that the preset feature database does not comprise a target feature data matching the first feature data, determine that the target road surface state is the first road surface state; or, in a case that the preset feature database comprises the target feature data matching the first feature data, determine that the target road surface state is the second road surface state.

12. The apparatus according to claim 8, wherein the at least one processor is configured to execute the instruction to:

transmit the first road surface image to a cloud server;

receive the target road surface state transmitted by the cloud server and obtained from identification performed by the cloud server on the first road surface image by using a road surface state identification model, wherein the target road surface state comprises the first road surface state or the second road surface state.

13. The apparatus according to claim 8, wherein the at least one processor is configured to execute the instruction to:
    after the outputting the first prompt message,
    in a case that a first input is received from a user, control the driverless vehicle to stop.

* * * * *